(12) United States Patent
Gaber

(10) Patent No.: US 6,208,461 B1
(45) Date of Patent: Mar. 27, 2001

(54) DAYTIME/NIGHTTIME ARMS SIGHT

(75) Inventor: Leonid Gaber, San Leandro, CA (US)

(73) Assignee: American Technologies Network, South San Francisco, CA (US)

( * ) Notice: Subject to any disclaimer, the term of this patent is extended or adjusted under 35 U.S.C. 154(b) by 0 days.

(21) Appl. No.: 09/557,869

(22) Filed: Apr. 24, 2000

(51) Int. Cl.[7] .................................................. G02B 23/00
(52) U.S. Cl. ............................. 359/399; 359/428; 33/246
(58) Field of Search ................................. 359/399, 400, 359/425, 427, 428; 33/245, 246; 42/101, 103

(56) References Cited

U.S. PATENT DOCUMENTS

| | | |
|---|---|---|
| 4,806,007 | 2/1989 | Bindon . |
| 4,822,994 | 4/1989 | Johnson et al. . |
| 5,272,514 | 12/1993 | Dor . |
| 5,283,427 * | 2/1994 | Phillips et al. ................. 250/214 VT |
| 5,745,287 * | 4/1998 | Sauter ................................... 359/428 |

* cited by examiner

Primary Examiner—Cassandra Spyrou
Assistant Examiner—Mark A. Robinson

(57) ABSTRACT

The optical gun sight for daytime and nighttime use in which a reticle illumination system has two operation states, one with full range of illumination for shooting during daytime and dusk and the other with the range of illumination safe for the expensive image intensifier tube. When the optical arms sight is used under night vision conditions, switching means interlocked with the nighttime aiming unit automatically switches the reticle illumination system to a safe mode of illumination, such as low-intensity light or infrared light so that the expensive image intensifier tube is protected from accidental damage due to "burning" of the reticle.

9 Claims, 5 Drawing Sheets

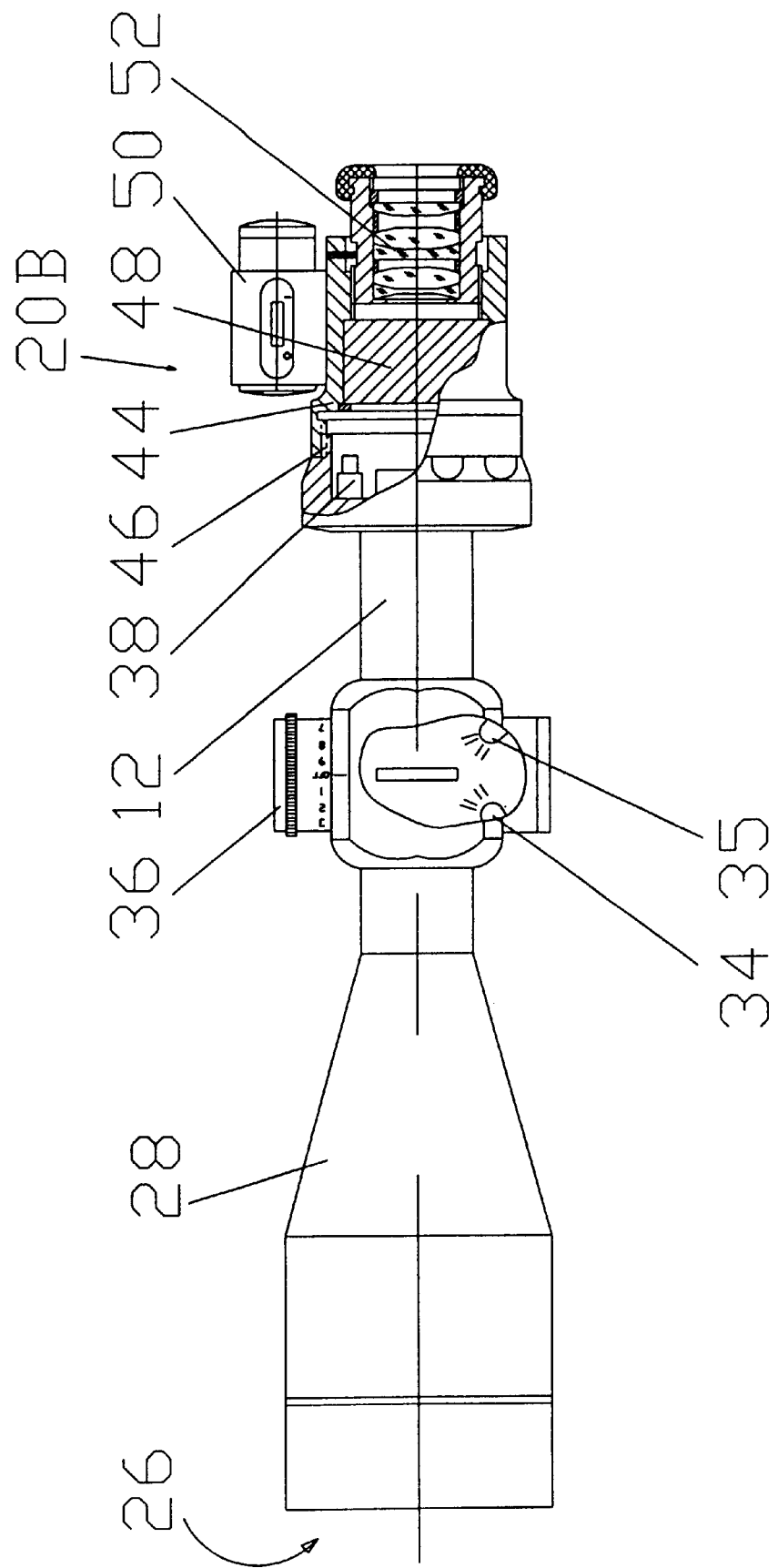

DAYTIME/NIGHTTIME ARMS SIGHT

FIELD OF THE INVENTION

This invention relates to an arms sight and, more particularly, to an optical arms sight usable for daytime operations and for nighttime operations and provided with means for protection of an image intensifier used in the night-vision aiming system.

DESCRIPTION OF THE PRIOR ART

In general a sight is utilized for aiming a gun at a directly visible target. In order to aim a gun, some form of a sighting device is required. There is a variety of sights used in weapons, and one of them is known as an optical sight. For shooting with high accuracy, each specific sight has to be adjusted to each specific rifle, and after being once removed, the adjustment procedure has to be repeated again. The sighting device may move with the gun barrel or may be separated from the gun. In general the use of such sighting devices in guns is well known.

In general, light conditions can be roughly classified into the following three categories: daylight, dusk, and nighttime. Therefore, the existing optical gun sights can be roughly classified as optical gun sights specifically for daytime shooting, for nighttime shooting, and for both light conditions. It is understood that the first two specialized sights give adequate high-accuracy performance but are not interchangeable without repeated rifle adjustment. Therefore, the users of such guns normally have two rifles for use under different light conditions. For intermediate light condition, such as dusk, depending on the amount of light, the shooter can use either a nighttime or a daytime sight. In the case shooting in the dusk is carried out with the use of a rifle equipped with the daytime optical sight, to make the reticle visible on the background, the sight is typically provided with a device for illuminating a targeting mark on a reticle. Such reticle illumination system is disclosed, e.g., in U.S. Pat. No. 4,806,007 issued in 1989 to G. Bindon.

As far as the universal sights for both nighttime and daytime use is concerned, they usually utilize either two optical paths, one for daytime conditions and another for nighttime conditions with switching between both, or replaceable ocular units, one for daytime conditions and another for nighttime conditions. Those universal sights which incorporate two optical paths, are more complex in design and lack compactness. A single-path universal optical gun sight is disclosed in U.S. Pat. No. 4,822,994 issued in 1989 to C. Johnson, et al. This gun sight, which is adapted for shooting at any time of the day, is normally provided with both a reticle illuminating device and replaceable ocular units which can be removably attached to a preadjusted optical gun sight on a rifle.

It understood that for nighttime shooting an optical sight should be equipped with a special light-intensifying device. Such a device is commonly known as an "intensifying tube" or "image intensifier". More specifically, the function of an image intensifier is to multiply the amount of incident light received by it to produce a greater signal for application to the eyes of a viewer. As such, these devices have been employed by the military and in commercial devices as well. Examples of early uses of such devices can be made by reference to a text entitled "Photoelectricity and Its Applications" published in 1949 by John Wiley & Sons. Chapter 18 entitled "Light Beam Signalling and Infrared Detection" shows examples of early nighttime vision devices which may be employed as gun sights such as the Sniperscope and Snooperscope.

The aforementioned image intensifiers are capable of increasing the intensity of incoming light in the optical sight up to 60,000 times and lately to 90,000. The image intensifier is a very complicated and expensive device which contributes up to 70% of the cost of the entire gun sight. It is also understood that the image intensifier amplifies by a factor of 60,000 or 90,000 not only the light reflected from the target and the surrounding objects, but also the light which is scattered by a targeting mark on the reticle illuminated by the aforementioned reticle illumination device, such as light-emitting diode. Although optical gun sights of the aforementioned type have a mechanism for adjusting the level of reticle illumination by incorporating multiple-position rotary switches, used, i.e., in gun sights of Aries 6600 model produced by American Technology Networks, South San Francisco, Calif., nothing prevents such sights from accidentally being left in the position corresponding to the reticle illumination level sufficient for "burning" the intensifier. In other words, if one accidentally forgets to switch the dusk reticle illumination device off, the expensive image intensifier tube can be irrecoverably damaged. This, in turn, will demand that the entire nighttime unit be replaced.

U.S. Pat. No. 5,272,514 issued in 1993 to Dor discloses a modular day/night weapon aiming system which comprises a red dot aiming portion having a light emitting diode, a combining mirror, and an apparatus for mounting the LED and the mirror on a weapon to produce a virtual image of the LED at an infinite distance in alignment with the bore sight of the weapon. The device also includes a removable night vision portion having an objective lens, an eyepiece, and an image intensification tube for intensifying a received image intermediate the objective lens and the eyepiece, wherein the virtual image is visible to the operator at night through the eyepiece, and the night vision portion is removed for use of the red dot aiming portion during the day. Generally, the system disclosed in the U.S. Pat. No. 5,272,514 possesses the same disadvantages as the previously described systems, in other words, it does not provide the protection of the image intensifier tube from being accidentally burned by the light produced by the LED or other light sources.

SUMMARY OF THE INVENTION

The optical gun sight for daytime and nighttime use in which a reticle illumination system has two operation states, one with full range of illumination for shooting during daytime and dusk and the other with the range of illumination safe for the expensive image intensifier tube. When the optical arms sight is used under night vision conditions, switching means interlocked with the nighttime aiming unit automatically switches off the reticle illumination system so that the expensive image intensifier tube is protected from accidental damage due to "burning" of the reticle. In another embodiment the reticle-illumination circuit is not switched off completely but rather is switched over to the level of light or a wavelength of light safe for the image-intensifier tube, e.g., to infrared light.

OBJECTS OF THE INVENTION

It is an object of the invention to provide an optical gun sight equipped with a reticle illumination device which allows safe switching between the daytime and nighttime modes of operation without a risk of damaging an expensive image intensifier.

Another object of the invention is to provide an optical gun sight device capable of automatically switching the daytime reticle illumination system off when a nighttime aiming system is installed.

Another object of the invention is to provide the gun sight of the aforementioned type which is simple and compact in construction.

Still another object of the invention is to provide the system of the night vision eyepiece protection compatible with the gun sights of various optical design, such as those utilizing both reflective and transmission optics.

BRIEF DESCRIPTION OF THE DRAWINGS

FIG. 3 is a top view of the optical gun sight of FIG. 3 equipped with a nighttime vision eyepiece.

DETAILED DESCRIPTION OF THE PREFERRED EMBODIMENT

The principle of the invention consists in that the arms sight of the invention has a reticle illumination system operating in two modes or states. In particular, in one state the reticle can be illuminated with a visible-light source up to full degree for use in daytime when the target has a dark background, i.e., when the reticle mark is difficult to see. Under this condition, illumination of the reticle makes it more visible. The same applies to aiming in the dusk. The second mode or state is complete disconnection of the reticle illumination light source or illumination with the level of light or a wavelength of light safe for the image intensifier tube. In other words, in the second mode or state the risk of accidental damage of the expensive intensifier tube is eliminated or minimized. This is achieved by automatically switching the reticle illumination light source, e.g., to an infrared light source when the nighttime aiming system is installed or switched for targeting under nighttime conditions.

In the context of the present invention, the term "reticle" covers visible marks of any kind, such as lines, circles, or dots, etc., placed in the focus of the sight aiming system.

The invention will now be described in more detail with reference to the accompanying drawings.

Figure 1:
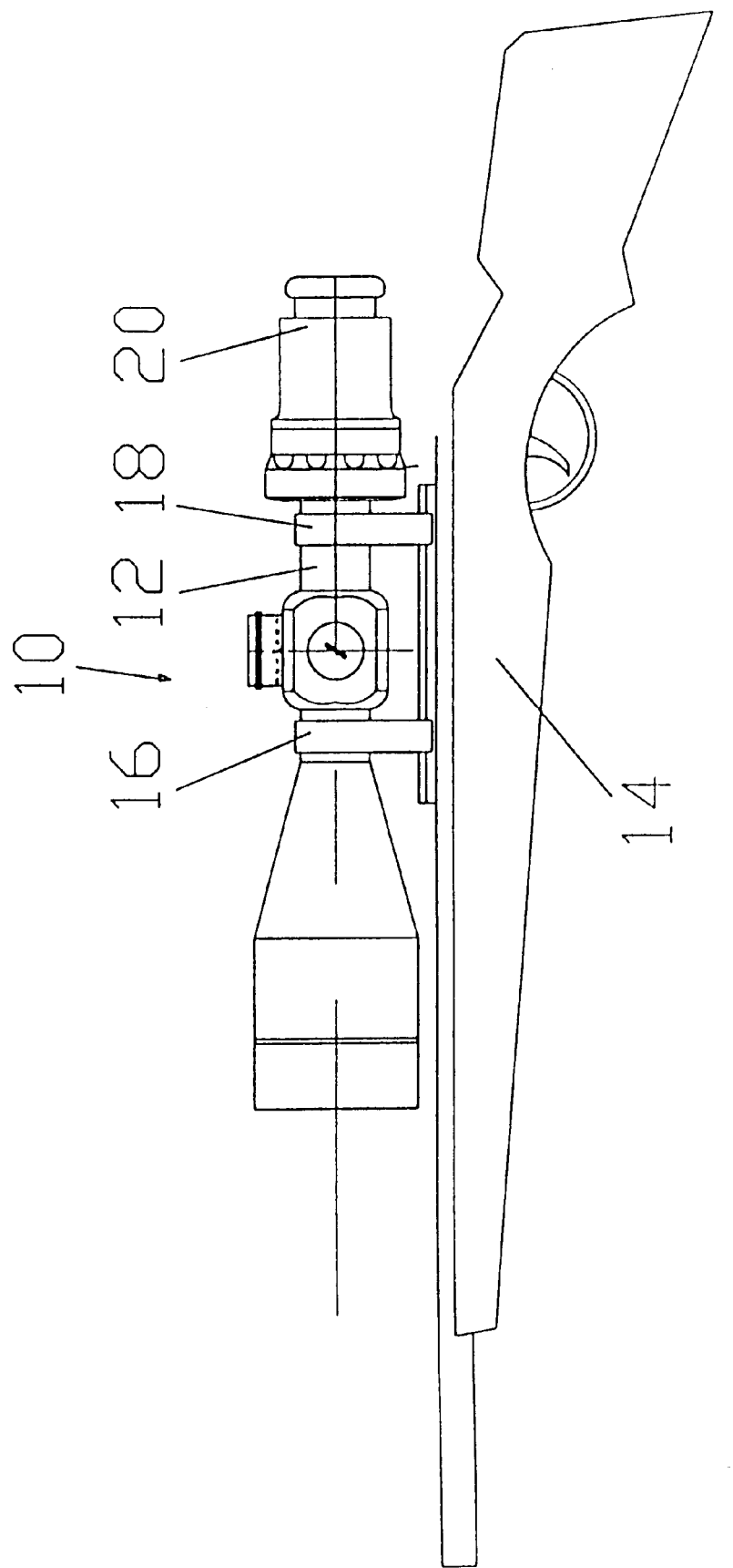
FIG. 1 is a general view of a rifle equipped with an optical gun sight of the invention.

FIG. 1 is a general view of a rifle equipped with an optical gun sight of the invention. As shown in this drawing, the optical gun sight, which as a whole is designated by reference numeral 10, consists of a stationary vision tube 12, which is rigidly attached to a rifle 14 by conventional means such as brackets 16 and 18, and a removable eyepiece 20 attachable to the stationary vision tube 12. In general, the system of the invention has a set of two eyepieces, one for daytime vision and one for nighttime vision. Reference numeral 20 designates eyepieces of both types in order to show their position on the sight and on the rifle. In the following description, the daytime eyepiece will be designated by reference numeral 20a, and the nighttime eyepiece will be designated by reference numeral 20b.

Figure 2:
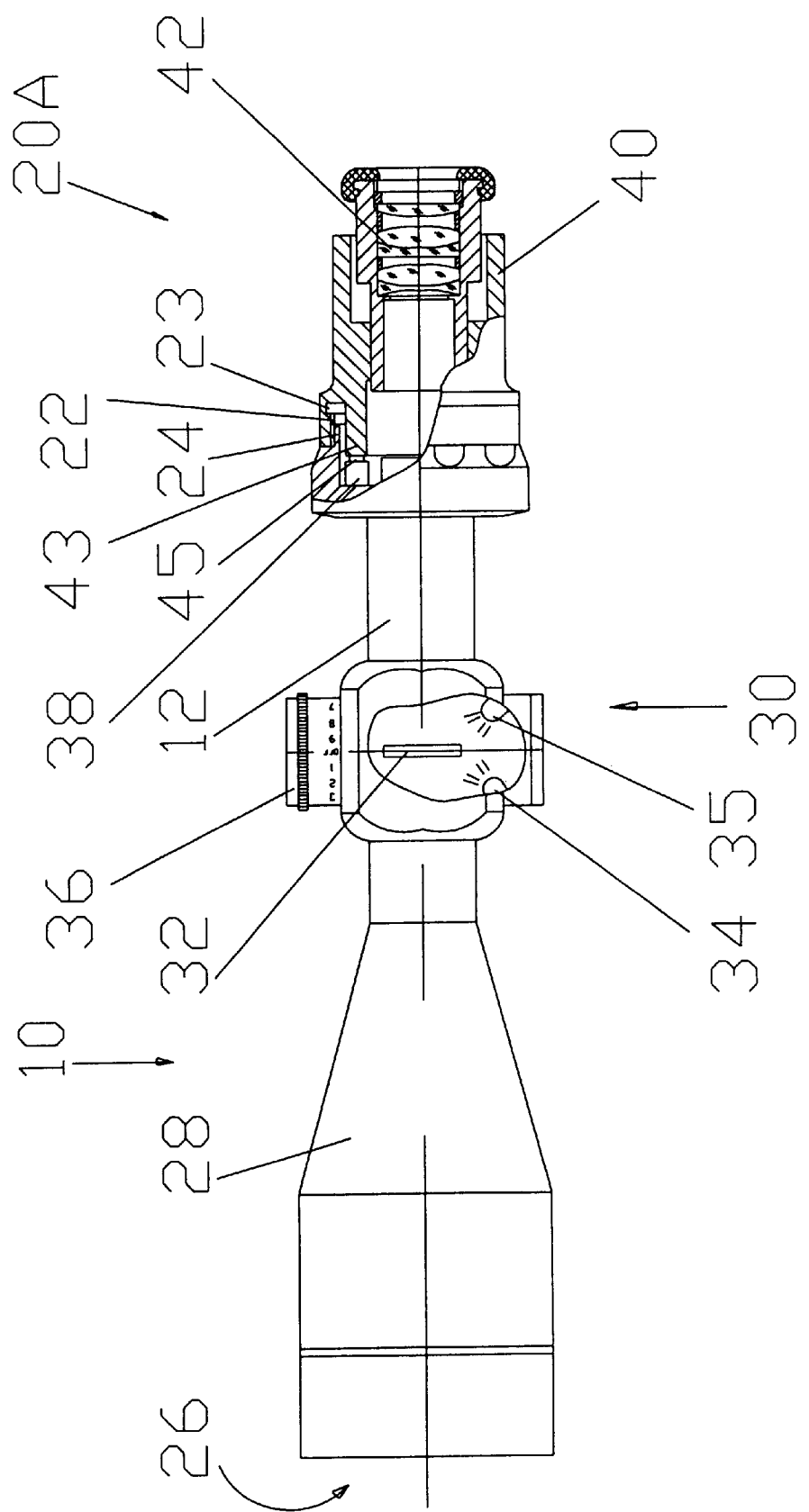
FIG. 2 is a top view of an optical gun sight of the invention equipped with a daytime vision eyepiece.

As shown in FIG. 2, which is a top view of an optical gun sight 10 of the invention equipped with a daytime vision eyepiece 20a, the latter is attached to the rear end of the vision tube 12 by means of an internal thread 22 in a bore 23 of the eyepiece 20a threaded onto the outer thread 24 on the rear end of the vision tube 12. In the context of the present patent application, the rear end of the vision tube is the one facing the eye of the shooter.

The front end of the vision tube is designated by reference numeral 26. An optics housing 28 contains conventional lenses and/or mirrors which are not shown and the construction and arrangement of which is beyond the scope of the present invention, as the principle of the invention is applicable to both reflective and refractive optical gun sights.

Located between the front end 26 and the rear end of the sight 10 is a targeting assembly 30 which consists of a reticle 32 and a reticle illumination system 34. A reticle is a system of marks located in the focal plane of an optical device. In the illustrated embodiment, reticle 32 is a transparent plate with targeting marks (not shown). As has been described earlier, these marks scatter the light in the direction of observation. As in conventional daytime gunsights, the reticle is illuminated by means of a reticle illumination system 34, such as, e.g., a light-emitting diode. The level of reticle illumination can be adjusted by a multiple-position rotary switch 36.

An essential feature of the present invention is that the rear end of the vision tube 12 has a switching element 38, e.g., an electric switch with normally-open or a normally-closed contacts which controls operation of the aforementioned reticle illumination system 34 so that the reticle is illuminated with the daytime eyepiece 20a, when the latter is attached, and is illuminated with a light of low intensity or with an infrared light when the nighttime eyepiece is attached to the vision tube 12, or when nothing is connected to the aforementioned vision tube 12 at all.

The daytime eyepiece 20A (FIG. 2) may consist merely of a tubular body 40 with the aforementioned inner thread 22 in the bore 23 of the body 40 on one end and with a set of ocular lenses 42 on the other end. The daytime eyepiece 20A has an engagement element, e.g., an annular projection 43 for engagement with the switching element 38 so that connection of the daytime eyepiece 20A to the rear end of the vision tube 12 will activate the switching element 38 by pressing on its contact tip 45.

The nighttime eyepiece 20B (FIG. 3) may consist of a tubular body 44 with the inner thread 46 of the same type as thread 22, an image intensifier tube 48, an intensifier power supply unit 50, e.g., a dry cell element, and a set of ocular lenses 52 on the rear end of the body 44.

In contrast to the daytime eyepiece 20A, in a position installed on the vision tube 12, the eyepiece 20B does not interact with the switching element 38 so that this switching element remains in a switched-off condition as if nothing has been attached. For this purpose, the nighttime eyepiece 20B shown in the embodiment of FIG. 3, has a free space so that nothing will engage the switching element 38 when the nighttime eyepiece 20B is attached to the vision tube 12.

Instead of low-intensity reticle illumination from the visible-light source 34, the contacts of the switch 38 may be interlocked with contacts of an infrared-light source 35 (FIG. 2) so that opening of the contacts of the visible-light source 34 will automatically close the contacts of the infrared-light source 35. This will allow to see the targeting marks on the reticle 32 through the image intensifier tube 48 without a risk of damaging it.

Figure 4A:
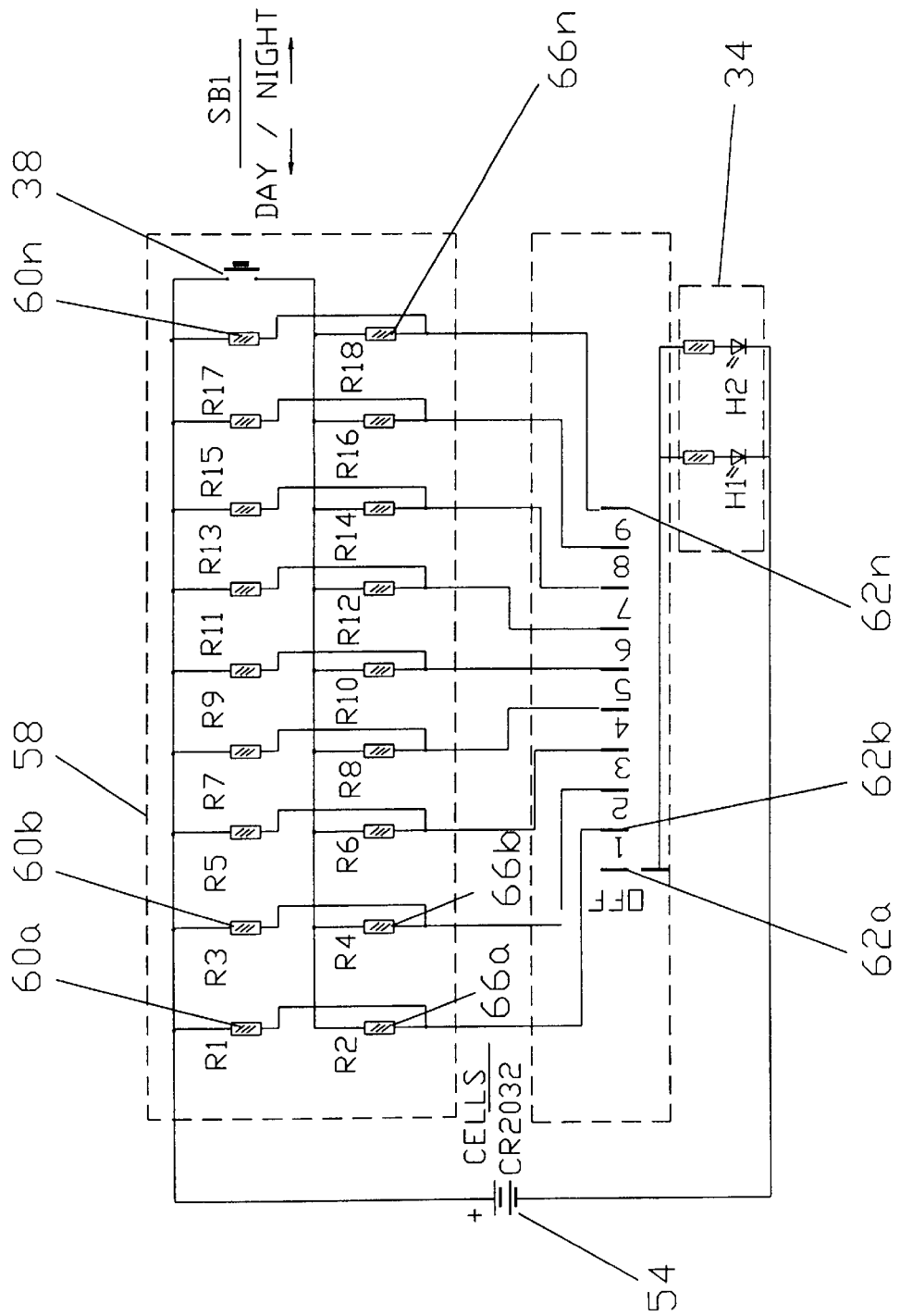
FIG. 4A is an electric diagram of a reticle illumination system of the gun sight switchable between a visible-light source and a low-intensity reticle illumination conditions.

FIG. 4A shows an electric diagram of a reticle illumination system of the gun sight of FIGS. 2 and 3. This diagram relates to an embodiment of the arms sight in which the reticle illumination system has a safe operation state when the contacts of the switch 38 are open, and the power source 54 is connected to the light source 34 via a group of resistors 60a, 60b, . . . 60n. In other words, the reticle is illuminated with low-intensity light. For adjusting the level of illumination, the resistors can be selectively connected to the power source 54 via a group of contacts 62a, 62b, . . . 62n.

When the contacts of the switch 38 of the electric circuit 4A are closed, the current will flow from the power source 54 to the light source 34 via a group of resistors 66a, 66b, . . . 66n and a group of resistors 60a, 60b, . . . 60n. As a result, the light source 34 will operate at its full illumination power, so that the reticle will be visible for daylight shooting conditions.

Figure 4B:
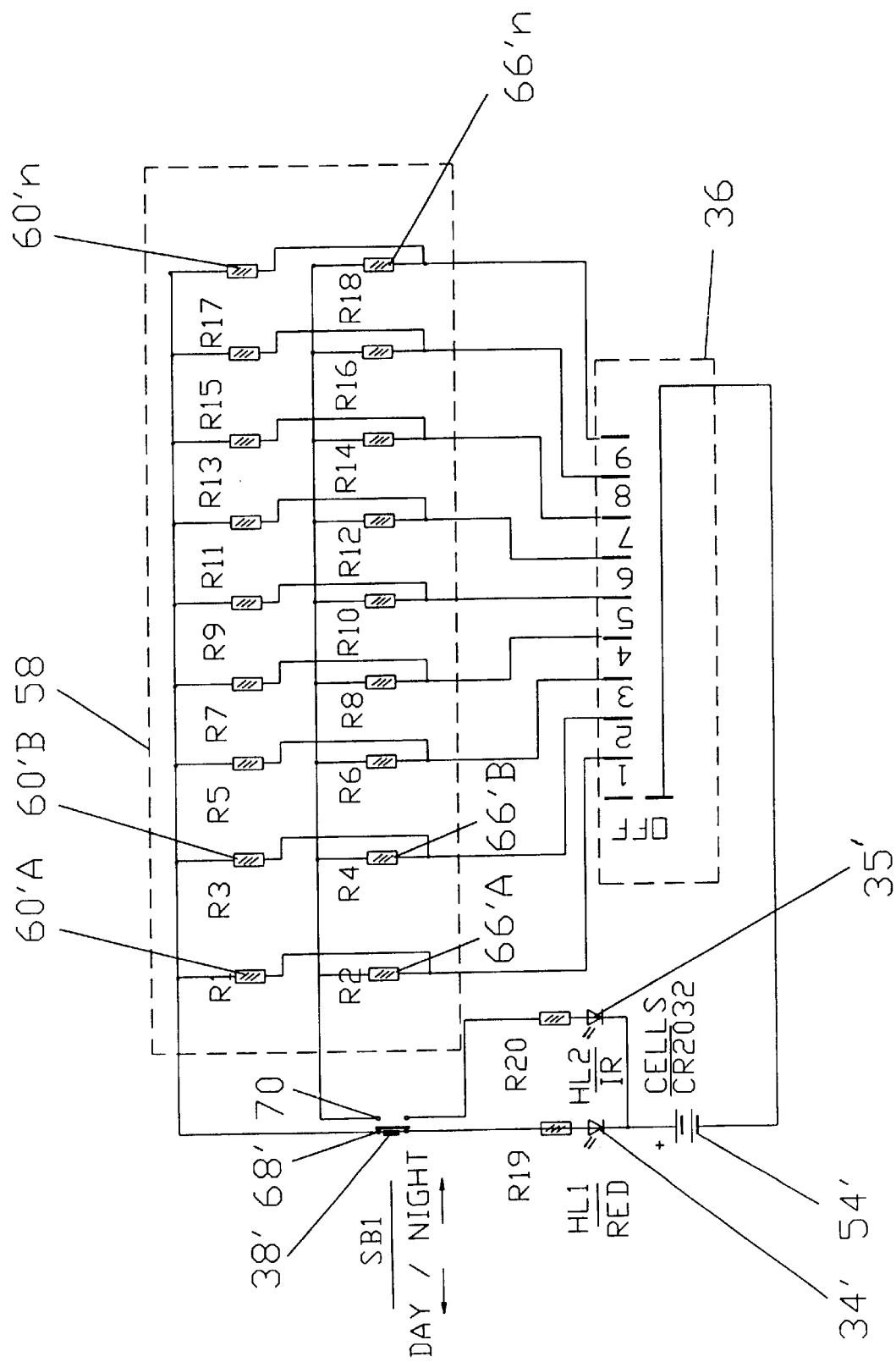
FIG. 4B is an electric diagram of a reticle illumination system of the gun sight switchable between a visible-light source and an infrared-light source.

FIG. 4B shows another embodiment of an electric diagram in which, instead of low-intensity illumination conditions, the safe operation state is ensured by switching the illumination system from the visible-light source to an infrared-light source 35' (FIG. 3 and FIG. 4B). Since elements of the circuit in FIG. 4B, other than the infrared-light source and associated parts, are the same as in FIG. 4A, identical elements of the circuit of FIG. 4B are designated by the same reference numerals with an addition of primes. In other words, the electric circuit of FIG. 4B is the same as the one shown in FIG. 4A, with the exception that an infrared-light source 35' is additionally connected in parallel to the visible-light source 34' and that an magazine of resistors 66a', 66b', . . . 66n' is interlocked with the magazine of resistors 60a', 60b', . . . 60n'. In other words, both groups of resistors are interlocked so that when the visible-light source 34' is switched on, the infrared-light source 35' is switched off. This is achieved due to the fact that the switch 38' has pairs of interlocked contacts 68' and 70 which operate in alternating mode so that when contacts 68' are open, the contacts 70 are closed and vice versa. This means that when the nighttime aiming system is installed or switched to a working position, the switch engaging element, such as projection 43 (FIG. 3), acts on the switch contacts 70 so that the sight is automatically switched to a safe mode of operation for the image intensifier tube 48. In the diagram of FIG. 4B, such safe operation mode is a mode when the infrared-light source 35 alone is used for illuminating the reticle 32 (FIG. 3).

Although the connection between the eyepiece and the optical tube was shown as a threaded connection, it is understood that both elements can be connected by means of a bayonet connection, a snap-on connection, a clamp, or the like. The reticle can be made in the form of a mirror, or a light spot used as a mark. A low visible-light level of reticle illumination can be used instead of the infrared light in a safe mode, provided this low visible-light level does not exceed, over the extended period of time of use, the level harmful for the image intensifier tube. The switch may have normally-open or normally closed contacts. The switch may be of an inductive type. In other words, the illustrated embodiments should no be construed as limitative, and any changes and modifications are possible, provided they do not depart from the scope of the appended claims.

Although the invention was described with reference to embodiments with replaceable eyepieces, the principle of the invention is also applicable to sights with switching mechanisms of the type described in aforementioned U.S. Pat. No. 5,272,514 with red dot aiming system.

What is claimed is:

1. An optical arms sight for daytime and nighttime use comprising:
   a vision tube rigidly attached to an arm;
   a nighttime aiming unit having an image intensifier tube;
   a daytime aiming unit having a reticle and a reticle illumination system, said reticle illumination system having at least two operation states, one of which is an operation state with full range of illumination during daytime and dusk illumination conditions and the other is a safe state with the range of illumination safe for said image intensifier tube when said optical arms sight is used under night vision conditions;
   switching means interlocked with said nighttime aiming unit and said daytime aiming unit so that switching on of said nighttime aiming unit switches off said reticle illumination system to said safe state.

2. The optical arms sight of claim 1, wherein said nighttime aiming unit and said daytime aiming unit each further has an eyepiece interchangeably engageable with said vision tube, said image intensifier tube being located in said eyepiece of said nighttime aiming unit, said reticle illumination system having an electric circuit which includes a power source, a reticle illumination means, and said switching means being switchable between said at least two operation states, said switching means being connected in series with said reticle illumination means, said switching means engaging one of said eyepieces when said one of said eyepieces is engaged with said vision tube.

3. The optical arms sight of claim 2, wherein said switching means has contacts normally-open when one of said eyepieces engaged with said vision tube is said eyepiece of said nighttime aiming unit.

4. The optical arms sight of claim 2, wherein said switching means has contacts normally-closed when one of said eyepieces engaged with said vision tube is said eyepiece of said daytime aiming unit.

5. The optical arms sight of claim 2, wherein said switching means has normally-closed contacts, and said eyepiece of said nighttime aiming unit has means for switching said reticle illumination means to safe state.

6. The optical arms sight of claim 5, wherein said means for switching said reticle illumination means to said safe state is a projection on said nighttime aiming unit which interacts with said switching means for opening said normally-closed contacts.

7. The optical arms sight of claim 5, wherein said reticle illumination means is further provided with an infrared light source and said safe state is selected from low-intensity illumination conditions and infrared illumination conditions.

8. The optical arms sight of claim 3, wherein said reticle illumination means is further provided with an infrared light source and said safe state is selected from low-intensity illumination conditions and infrared illumination conditions.

9. An optical arms sight for daytime and nighttime use comprising a vision tube rigidly attached to an arm and set of a daytime eyepiece and a nighttime eyepiece both interchangeably engageable with said vision tube for reproduction of an image of a remote object in a working position of said daytime eyepiece and a nighttime eyepiece, said nighttime eyepiece having an image intensifier tube for intensifying said image to a degree visible at night time, said vision tube having a reticle illumination system and switching means, said reticle illumination system having a first illumination level which is safe for operation of said image intensifier tube and a second illumination level with full-range illumination intensity, said switching means being interlocked with said daytime eyepiece and said nighttime eyepiece so that when said daytime eyepiece is installed in said working position, said reticle illumination system is switched to said full-range illumination intensity and when said nighttime eyepiece is installed in said working position, said reticle illumination system is switched to said first illumination level.

* * * * *